(12) United States Patent
Sakata (10) Patent No.: US 8,456,326 B2
(45) Date of Patent: Jun. 4, 2013

(54) POSITION REGISTERING APPARATUS, POSITION REGISTERING METHOD, POSITION REGISTERING PROGRAM, AND RECORDING MEDIUM (75) Inventor: Daisuke Sakata, Kawagoe-shi (JP)

(73) Assignee: Pioneer Corporation, Tokyo (JP)

( * ) Notice: Subject to any disclaimer, the term of this patent is extended or adjusted under 35 U.S.C. 154(b) by 1076 days.

(21) Appl. No.: 12/294,407

(22) PCT Filed: Mar. 16, 2007

(86) PCT No.: PCT/JP2007/055373
§ 371 (c)(1),
(2), (4) Date: Sep. 24, 2008

(87) PCT Pub. No.: WO2007/122927
PCT Pub. Date: Nov. 1, 2007

(65) Prior Publication Data
US 2009/0281725 A1 Nov. 12, 2009

(30) Foreign Application Priority Data
Mar. 24, 2006 (JP) .................. 2006-084099

(51) Int. Cl.
*B60Q 1/48* (2006.01)
*G08G 1/01* (2006.01)
*G08G 1/123* (2006.01)
*G01C 21/36* (2006.01)

(52) U.S. Cl.
CPC ........ *G01C 21/3685* (2013.01); *G01C 21/3679* (2013.01)
USPC ........................ 340/932.2; 340/935; 701/532

(58) Field of Classification Search
None
See application file for complete search history.

(56) References Cited

U.S. PATENT DOCUMENTS 6,133,855 A * 10/2000 Kim ........................ 340/932.2
6,192,314 B1   2/2001 Khavakh et al.
(Continued)

FOREIGN PATENT DOCUMENTS

EP   1 995 557 A1   11/2008
JP   11-23302        1/1999
(Continued)

OTHER PUBLICATIONS

Sakuragi, Toshio. JP 2006-275838 "Navigation Server, Its Control Method and Control Program, Navigation Terminal and Method, Navigation System, and Its Control Method". Oct. 12, 2006. Translation included.*

(Continued)

*Primary Examiner* — Ryan Zeender
*Assistant Examiner* — H Rojas
(74) *Attorney, Agent, or Firm* — Young & Thompson (57) ABSTRACT

An acquiring unit (101) acquires traveling state information indicating a traveling state of a mobile object. A position identifying unit (102) identifies the current position of the mobile object, based on the traveling state information and map information. If the current position of the mobile object identified to be on a road is subsequently identified not to be on any road, a registering unit (103) registers into a storage unit, a deviation point from the road as an entrance point to a parking lot. When a new deviation point is registered as an entrance point to the parking lot, if an entrance point in the vicinity of the new deviation point is already registered, the registering unit (103) determines whether the new deviation point is to be newly registered as an entrance point to the parking lot based on information about the entrance points.

15 Claims, 5 Drawing Sheets

U.S. PATENT DOCUMENTS 6,356,837 B1 * 3/2002 Yokota et al. .................. 701/411
6,453,235 B1 * 9/2002 Endo et al. .................... 701/428

FOREIGN PATENT DOCUMENTS

| JP | 2000 310542 A | 11/2000 |
| JP | 2003-14479 | 1/2003 |
| JP | 2004-012425 | 1/2004 |

OTHER PUBLICATIONS

European Search Report dated Sep. 6, 2010.

* cited by examiner

POSITION REGISTERING APPARATUS, POSITION REGISTERING METHOD, POSITION REGISTERING PROGRAM, AND RECORDING MEDIUM

TECHNICAL FIELD

The present invention relates to a position registering apparatus, a position registering method, a position registering program, and a recording medium capable of correlating and automatically recording an entrance and an exit of a parking lot near a destination that has been set.

BACKGROUND ART

Conventionally, an information providing apparatus has been provided that includes a current position calculating unit calculating a current position of a vehicle; a parking lot information acquiring unit acquiring parking lot information from the current position calculated by the current position calculating unit and parking lot locating data read from a map data storage unit; a route retrieving unit conducting route retrieval taking into account entrances and exits based on the information from the parking lot information acquiring unit and the map data storage unit; the map data storage unit storing map data and parking lot data; a display controlling unit conducting control for displaying a result of route retrieval taking into account entrances and exits retrieved by the route searching unit; and a displaying unit controlled by the display controlling unit and displaying the result of route retrieval taking into account entrances and exits, where the information providing apparatus can provide effective information taking into account entrances and exits of facilities such as parking lots (see, e.g., Patent Document 1).

Patent Document 1: Japanese Patent Application Laid-Open Publication No. 2004-12425

DISCLOSURE OF INVENTION

Problem to be Solved by the Invention

However, in the case of the information providing apparatus of the conventional art described in Patent Document 1, if the route retrieving unit retrieves a route to a parking lot when an entrance point to the parking lot is not recorded in the map information, the parking lot information. etc., only a route to the vicinity of the parking lot can be retrieved. Therefore, even if one can somehow arrive at the vicinity of the parking lot, it is problematic in that an entrance of the parking lot can not immediately be identified and that the entrance of the parking lot must be searched for after arrival, posing a significant inconvenience, for example.

Although it is conceivable to preliminarily record entrance points of parking lots for all the parking lots included in map information, parking lot information, etc., it is problematic in that data edit operations, etc., become very difficult due to an increase in the amount of recorded data, resulting in increased product cost, for example.

Although it is conceivable that entrance points and exit points are embedded in map information, parking lot information, etc., through operation and input by a user for parking lots utilized by the user, it is problematic in that associated input operations are troublesome for the user and improved convenience cannot be expected, for example.

Means for Solving Problem

To solve the problems above and achieve an object a position registering apparatus according to the invention of claim 1 includes an acquiring unit that acquires traveling state information indicating a traveling state of a mobile object; a position identifying unit that identifies a current position of the mobile object based on the traveling state information and map information; and a registering unit that registers, into a storage unit, a first deviation point from a road as a first entrance point to a parking lot when the current position identified to be on the road is subsequently identified not to be on any road. The registering unit, when a second deviation point is in a vicinity of the first entrance point, determines whether the second deviation point is to be registered as a second entrance point to the parking lot based on information concerning the first entrance point and executes a process based on a determination result.

A position registering apparatus according to the invention of claim 6 includes an acquiring unit that acquires traveling state information indicating a traveling state of a mobile object; a position identifying unit that identifies a current position of the mobile object based on the traveling state information and map information; a destination setting unit that sets a destination; a parking determining unit that determines whether the mobile object is parked; and a registering unit that registers into a storage unit, a first deviation point from a road as a first entrance point to a parking lot of the destination when the mobile object is determined to be parked after the current position identified to be on the road within a predetermined range from the destination is subsequently identified not to be on any road. The registering unit, when a second deviation point is in a vicinity of the first entrance point, determines whether the second deviation point is to be registered as a second entrance point to the parking lot of the destination based on information about the first entrance point and executes a process based on a determination result.

A position registering method according to the invention of claim 12 includes an acquiring step of acquiring traveling state information indicating a traveling state of a mobile object; a position identifying step of identifying a current position of the mobile object based on the traveling state information and map information; and a registering step of registering, into a storage unit, a first deviation point from a road as a first entrance point to a parking lot when the current position identified to be on the road is subsequently identified not to be on any road. The registering step, when a second deviation point is in a vicinity of the first entrance point, include determining whether the second deviation point is to be registered as a second entrance point to the parking lot based on information concerning the first entrance point and executing a process based on a determination result.

A position registering method according to the invention of claim 13 includes an acquiring step of acquiring traveling state information indicating a traveling state of a mobile object; a position identifying step of identifying a current position of the mobile object based on the traveling state information and map information; a destination setting step of setting a destination; a saving step of temporarily saving a first deviation point from a road when the current position identified to be on the road within a predetermined range from the destination is subsequently identified not to be on any road; a parking determining step of determining whether the mobile object is parked when the current position is identified not to be on any road; and a registering step of registering the first deviation point as a first entrance point to the parking lot of the destination when the deviation point is within a predetermined range from the destination and the mobile object is determined to be parked. The registering step, when the first entrance point to the parking lot of the destination has been registered, includes determining whether a second deviation point is to be registered as a second entrance point to the parking lot of the destination based on information about the first entrance point and executing a process based on a determination result.

A position-registering computer program according to the invention of claim 14 causes a computer to execute the position registering method according to claim 12 or 13.

A computer-readable recording medium according to the invention of claim 15 stores therein the position-registering computer program according to claim 14.

EXPLANATIONS OF LETTERS OR NUMERALS 100 position registering apparatus
101 acquiring unit
102 position identifying unit
103 registering unit
104 entering-method determining unit
105 destination setting unit
106 parking determining unit
107 storage unit

BEST MODE(S) FOR CARRYING OUT THE INVENTION

A preferred embodiment is described hereinafter for a position registering apparatus, a position registering method, a position registering program, and a recording medium according to the present invention with reference to the accompanying drawings.

Embodiment

Functional Configuration of Position Registering Apparatus

Figure 1:
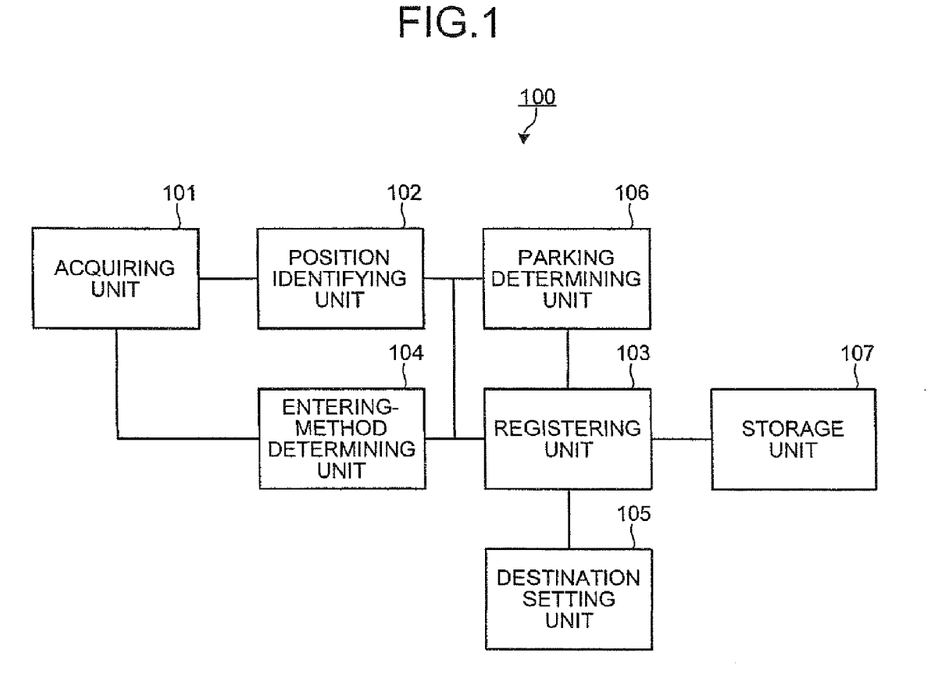
FIG. 1 is a block diagram of a functional configuration of a position registering apparatus according to an embodiment.

A functional configuration of a position registering apparatus according to the embodiment is described with reference to FIG. 1. FIG. 1 is a block diagram of a functional configuration of a position registering apparatus according to the embodiment. As shown in FIG. 1, a position registering apparatus 100 includes an acquiring unit 101, a position identifying unit 102, a registering unit 103, an entering-method determining unit 104, a destination setting unit 105, a parking determining unit 106, and a storage unit 107.

The acquiring unit 101 acquires traveling state information indicating the traveling state of a mobile object. The traveling state information is information including position information, velocity information, and traveling direction information concerning the mobile object, for example. The traveling state information is calculated with the use of signals received from GPS satellites by a GPS receiver mounted on the mobile object or values output from sensors disposed on the mobile object.

The position identifying unit 102 identifies the current position of the mobile object based on the traveling state information acquired by the acquiring unit 101 and map information. The map information is information such as road shape information consisting of nodes and links, and image data drawn with the use of features related to facilities, roads, and other geographic features (mountains, rivers, land).

For example, the position identifying unit 102 identifies the current position of the mobile object on a road by executing a map matching process to correct an estimated current position, which is the current position of the mobile object calculated from signals received from GPS satellites and values output from sensors, or identifies the estimated current position directly as the current position of the mobile object at a place other than on a road.

The map matching process is a process of comparing the road shape data with position information, a traveling direction, a traveling distance, etc., of the mobile object to correct the position of the mobile object on a road if it is determined the mobile object is traveling on the road.

The registering unit 103 registers, into the storage unit 107, a deviation point on a road as an entrance point to a parking lot, if the current position of the mobile object identified to be on a road is subsequently identified to be at a place other than a road by the position identifying unit 102. The deviation point is the last current position of the mobile object identified to be on the road by the position identifying unit 102 when the mobile object deviates from the road to a place other than a road.

When a new deviation point is registered as an entrance point to the parking lot, if an entrance point in the vicinity of the new deviation point has been previously registered, the registering unit 103 determines whether the new deviation point is to be newly registered as an entrance point to the parking lot based on information about these entrance points and executes a process based on the determination result. For example, if it is determined that the road including a new deviation point is different from the road including a previously registered entrance point, the registering unit 103 newly registers the new deviation point as an entrance of the parking lot.

When registering an entrance point, the registering unit 103 correlates and registers the entering method determined by the entering-method determining unit 104, described later, with the entrance point into the storage unit 107, and if it is determined that the road including the new deviation point is identical to the road including the previously registered entrance point and the entering direction corresponding to the new deviation point is different from the entering direction of the entering method correlated and registered with the previously registered entrance point, the registering unit 103 may newly register the new deviation point as an entrance point to the parking lot.

If it is determined that the road including the new deviation point is identical to the road including the previously registered entrance point and the entering direction corresponding to the new deviation point is identical to the entering direction of the entering method correlated and registered with the previously registered entrance point, the registering unit 103 may not register the new deviation point as an entrance point to the parking lot.

After the registration of the entrance point, if the current position of the mobile object identified to be at a place other than on a road is subsequently identified to be on a road, the registering unit 103 registers a returning point onto the road as an exit point from the parking lot into the storage unit 107, and when a new returning point is registered as an exit point from the parking lot, if an exit point from the parking lot has already been registered in the vicinity of the new returning point, the registering unit 103 determines whether the new returning point is to be newly registered as an exit point from the parking lot based on information about these exit points and executes a process based on the determination result. The returning point is the first current position, of the mobile object, identified to be on a road by the position identifying unit 102 when the mobile object returns onto a road from a place other than a road.

If it is determined that the road including the new returning point is different from the road including the previously registered exit point, the registering unit 103 may newly register the new returning point as an exit point from the parking lot.

When registering an exit point, the registering unit 103 correlates and registers the exiting method with the exit point and if it is determined that the road including the new returning point is identical to the road including the previously registered exit point and the exiting direction corresponding to the new returning point is different from the exiting direction of the exiting method correlated and registered with the previously registered exit point, the registering unit 103 may newly register the new returning point as an exit point from the parking lot.

If it is determined that the road including the new returning point is identical to the road including the previously registered exit point and the exiting direction corresponding to the new returning point is identical to the exiting direction of the exiting method correlated and registered with the previously registered exit point, the registering unit 103 may not register the new returning point as an exit point from the parking lot.

In the case where a destination has been set by the destination setting unit 105, if it is determined that the distance between a new deviation point and a previously registered entrance point to the parking lot of the destination is greater than a predetermined value, the registering unit 103 may newly register the new deviation point as an entrance point to the parking lot of the destination.

If it is determined that the distance between the new deviation point and the previously registered entrance point to the parking lot of the destination is not greater than a predetermined value, the registering unit 103 may newly register the new deviation point as an entrance point to the parking lot of the destination if it is determined that the road including the new deviation point is different from the road including the previously registered entrance point to the parking lot of the destination.

If it is determined that the distance between the new deviation point and the previously registered entrance point to the parking lot of the destination is not greater than a predetermined value, the registering unit 103 may newly register the new deviation point as an entrance point to the parking lot if it is determined that the road including the new deviation point is identical to the road including the previously registered entrance point to the parking lot of the destination and the entering direction corresponding to the new deviation point is different from the entering direction of the entering method correlated and registered with the previously registered entrance point.

If it is determined that the distance between the new deviation point and the previously registered entrance point to the parking lot of the destination is not greater than a predetermined value, the registering unit 103 may not register the new deviation point as an entrance point to the parking lot if it is determined that the road including the new deviation point is identical to the road including the previously registered entrance point to the parking lot of the destination and the entering direction corresponding to the new deviation point is identical to the entering direction of the entering method correlated and registered with the previously registered entrance point.

After the registration of the entrance point to the parking lot of the destination, if the current position of the mobile object identified to be at a place other than on a road is subsequently identified to be on a road, the registering unit 103 registers a returning point onto the road as an exit point of the parking lot of the destination, and when a new returning point is registered as an exit point from the parking lot, if an exit point of the parking lot of the destination has already been registered, the registering unit 103 may determine whether the new returning point is to be newly registered as an exit point from the parking lot based on information about these exit points and may execute a process based on the determination result.

If it is determined that the distance between the new returning point and the previously registered exit point of the parking lot of the destination is greater than a predetermined value, the registering unit 103 may newly register the new returning point as an exit point from the parking lot.

If it is determined that the distance between the new returning point and the previously registered exit point of the parking lot of the destination is not greater than a predetermined value, the registering unit 103 may newly register the new returning point as an exit point from the parking lot if it is determined that the road including the new returning point is different from the road including the previously registered exit point of the parking lot of the destination.

When registering an exit point, the registering unit 103 correlates and registers the exiting method with the exit point, and if it is determined that the distance between a new returning point and the previously registered exit point of the parking lot of the destination is not greater than a predetermined value, the registering unit 103 may newly register the new returning point as an exit point of the parking lot of the destination if it is determined that the road including the new returning point is identical to the road including the previously registered exit point of the parking lot of the destination and the exiting direction corresponding to the new returning point is different from the exiting direction of the exiting method correlated and registered with the previously registered exit point of the parking lot of the destination.

If it is determined that the distance between the new returning point and the previously registered exit point of the parking lot of the destination is not greater than a predetermined value, the registering unit 103 may not register the new returning point as an exit point of the parking lot of the destination if it is determined that the road including the new returning point is identical to the road including the previously registered exit point of the parking lot of the destination and the exiting direction corresponding to the new returning point is identical to the exiting direction of the exiting method correlated and registered with the previously registered exit point of the parking lot of the destination.

If the parking determining unit 106 determines that the mobile object is parked, the registering unit 103 may register the deviation point as an entrance point to the parking lot into the storage unit 107.

If the parking determining unit 106 determines that the mobile object is not parked, the registering unit 103 does not register the deviation point as an entrance point to the parking lot into the storage unit 107. As described above, even if the current position of the mobile object is identified to be at a place other than on a road, when it is determined that the mobile object is not parked, an entrance point to the parking lot is not registered. Therefore, for example, if the current position of the mobile object returns onto a road immediately after the current position of the mobile object is identified to be at a place other than on a road, incorrect registration of an entrance point to a parking lot can be prevented.

The entering-method determining unit 104 determines an entering method based on a traveling state of the mobile object when the current position of the mobile object identified to be on a road is subsequently identified to be at a place other than a road by the position identifying unit 102. The registering unit 103 registers, into the storage unit 107 and in correlation with the entrance point to the parking lot, the entering method determined by the entering-method determining unit 104.

The entering method indicates how the mobile object entered the parking lot through the entrance point from a road and, for example, the entering method may indicate that the mobile object turns right, turns left, or goes straight to enter the entrance point to the parking lot from a road. If the entering-method determining unit 104 determines the entering method, the entering method indicating how the entrance point to the parking lot can be entered from the road is registered into the storage unit 107 in correlation with the entrance point to the parking lot.

The destination setting unit 105 accepts input from a user to set a destination. Specifically, for example, a user can manipulate an input unit to input the name of a place or the address of a destination, or may plot and input the destination on a map displayed on a displaying unit, not shown. The destination is not limited to a final destination at which a user wants to ultimately arrive, but also may be a via-point passed on the way.

The parking determining unit 106 determines whether the mobile object is parked. Parking as used herein means a state in which the current position of the mobile object does not change (e.g., for five minutes). With regard to the determination of whether the mobile object is parked, the parking determining unit 106 determines that the mobile object is parked if, from the traveling state information, it is detected that the current position of the mobile object does not change while at a place that is not on a road for a predetermined time.

The parking determining unit 106 may determine that the mobile object is parked if, from the traveling state information and the map information, it is detected that the current position of the mobile object identified to be at a place other than on a road is present within a range of a parking lot recorded in the map information. The parking determining unit 106 may also determine that the mobile object is parked if it is detected that a drive source of the mobile object is stopped.

If the current position of the mobile object identified to be on a road is subsequently identified to be at a place other than on a road, the registering unit 103 may temporarily save a deviation point in a memory, etc. not shown, without registration, and when the parking determining unit 106 determines that the mobile object is parked, the registering unit 103 may register, into the storage unit 107, the temporarily saved deviation point as an entrance point to the parking lot.

In the storage unit 107, when the current position of the mobile object identified to be on a road is subsequently identified to be at a place other than on a road, a deviation point from the road is stored as an entrance point to the parking lot. In the storage unit 107, when the entrance point is registered, the entering method determined by the entering-method determining unit 104 is correlated and stored with the entrance point to the parking lot.

In the storage unit 107, after the registration of the entrance point, if the current position of the mobile object identified to be at a place other than on a road is subsequently identified to be on a road, a returning point onto the road is stored as an exit point from the parking lot.

In the storage unit 107, after the current position of the mobile object identified to be on a road within a predetermined range from a destination is subsequently identified to be at a place other than on a road, if it is determined that the mobile object is parked, the deviation point is stored as an entrance point to the parking lot.

The predetermined range is set according to the category of the destination and may be a direct distance to the destination or a distance along a road. The category of the destination is classified by the type of the destination and respective predetermined ranges are set for a large facility such as an amusement park and a small facility such as a convenience store. Specifically, for example, the predetermined range is set to a radius of 1 km or less in the case of an amusement park and is set to a radius of 50 km or less in the case of a convenience store.

(Process Details of Position Registering Apparatus)

Figure 2:
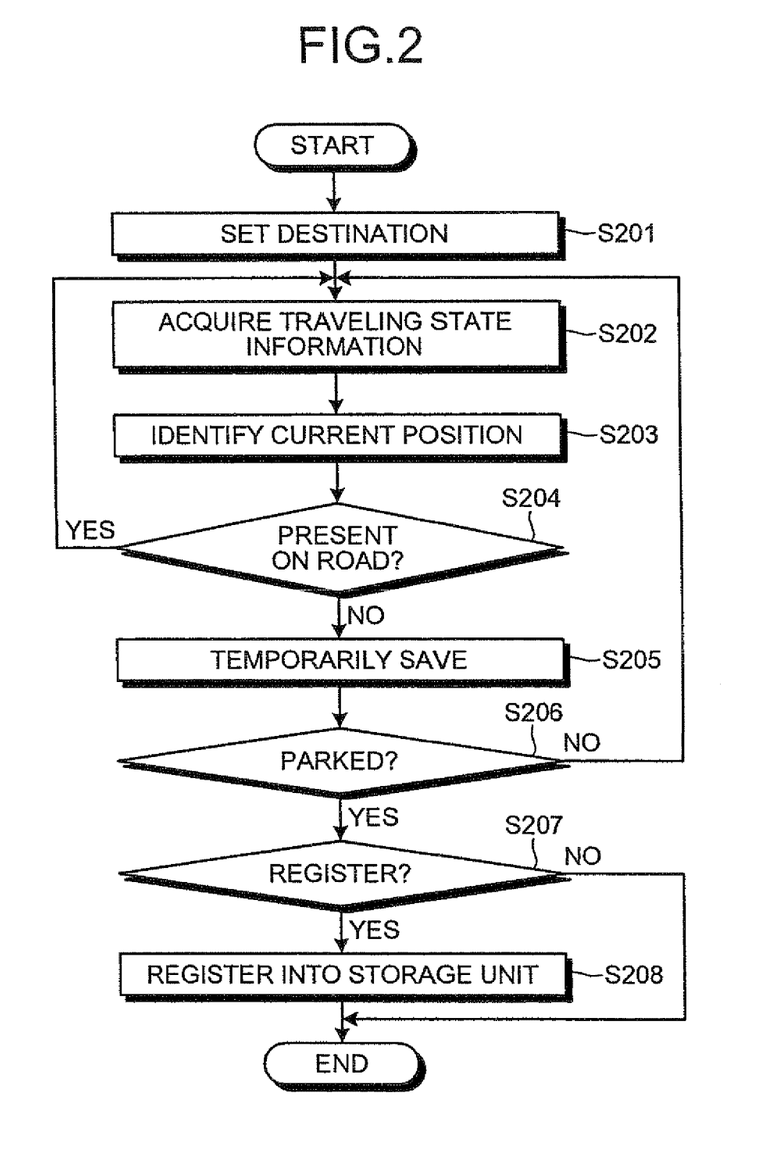
FIG. 2 is a flowchart of an example of a process performed by the position registering apparatus according to the embodiment.

Details of the process performed by the position registering apparatus according to the present invention are described. FIG. 2 is a flowchart of an example of the process performed by the position registering apparatus according to the embodiment. As shown in the flowchart of FIG. 2, the destination setting unit 105 sets a destination (step S201). For example, the destination is set by a user manipulating an input unit, not shown, to input the name of a place or the address of a destination.

The acquiring unit 101 acquires traveling state information indicating the traveling state of a mobile object (step S202). The traveling state information acquired by the acquiring unit 101 is information including position information, velocity information, traveling direction information, etc., of the mobile object.

The position identifying unit 102 identifies the current position of the mobile object, based on the traveling state information and map information (step S203). The current position of the mobile object identified by the position identifying unit 102 may be, for example, an estimated current position calculated from signals received from GPS satellites and values output from various sensors, or a current position obtained by correcting the estimated current position with the map matching process.

A determining unit, not shown, of the position registering apparatus 100 determines whether the current position of the mobile object is on a road (step S204). If it is determined that the current position of the mobile object is on a road (step S204: YES), the process goes to step S202. On the other hand, if it is determined that the current position of the mobile object is not on a road (step S204: NO), a deviation point from the road is saved in a memory unit, not shown, of the position registering apparatus 100 (step S205).

The parking determining unit 106 determines whether the mobile object is parked if the current position of the mobile object is identified to be at a place other than on a road (step S206). Whether the mobile object is parked is determined with the use of the traveling state information, for example. Specifically, for example, when the current position of the mobile object is identified to be at a place other than on a road, if the current position of the mobile object does not change for five minutes, it is determined that the mobile object is parked.

If it is determined that the mobile object is not parked (step S206: NO), the process goes to step S202. If it is determined that the mobile object is parked (step S206: YES), the registering unit 103 determines whether the new deviation point is to be newly registered as an entrance point to a parking lot of the destination (step S207). For example, if the new deviation point is within a predetermined range from a destination and an entrance point to the parking lot of the destination is already registered, it is determined whether the new deviation point is to be newly registered as an entrance point to the parking lot of the destination based on information about these entrance points. For example, if the new deviation point is not within a predetermined range from the destination, it is determined that the new deviation point is not to be registered as an entrance point to the parking lot of the destination. For example, if the new deviation point is within a predetermined range from the destination and if an entrance point to the parking lot of the destination is not already registered, it is determined that the new deviation point is to be registered as an entrance point to the parking lot of the destination.

If it is determined that the position is to be registered (step S207: YES), the registering unit 103 registers, into the storage unit 107, the deviation point temporarily saved in the memory unit, not shown, as an entrance point to the parking lot (step S208). On the other hand, if it is determined that the position is not to be registered (step S207: NO), and a sequence of the process of this flowchart ends.

After the entrance point to the parking lot is registered at step S208, if the current position of the mobile object identified to be at a place other than on a road is subsequently identified to be on a road, the registering unit 103 may register, into the storage unit 107, a returning point onto the road as an exit point from the parking lot. As in the case of the process at step S207, the registering unit 103 determines whether a new returning point is to be registered as an exit point from the parking lot and executes a process based on the determination result.

At step S208, if the entering method is determined by the entering-method determining unit 104, the registering unit 103 may correlate and register the entering method with the entrance point to the parking lot.

Although the process of the position registering apparatus 100 according to the embodiment is based on the premise that a destination is set, the position registering apparatus 100 according to the embodiment can be executed if a destination is not set. For example, when the current position of the mobile object identified to be on a road is subsequently identified to be at a place other than on a road and a new deviation point is registered as an entrance point to a parking lot, if an entrance point, to a parking lot, in the vicinity of the new deviation point has already been registered, the registering unit 103 determines whether the new deviation point is to be newly registered as an entrance point to the parking lot based on information about these entrance points and executes a process based on the determination result.

As described above, according to the embodiment, if the current position of the mobile object identified to be on a road is subsequently identified to be at a place other than on a road, the position registering apparatus 100 registers a deviation point from the road as an entrance point to a parking lot, and when a new deviation point is registered as an entrance point to the parking lot, if an entrance point in the vicinity of the new deviation point has already been registered, the position registering apparatus 100 determines whether the new deviation point is to be newly registered as an entrance point to the parking lot based on information about these entrance points and executes a process based on the determination result.

Therefore, a parking lot entrance point not preliminarily set in the map information can be registered, and entrance points that are actually the same can be prevented from being registered separately as different entrance points to the parking lot.

The position registering apparatus 100 can determine an entering direction when the mobile object deviates from a road and can use this entering direction to determine whether the new deviation point is to be newly registered as an entrance point to the parking lot. Therefore, if parking lots are present on both sides of a road including the deviation point, it can be detected whether the entrance points are for the same parking lot.

After the entrance point to the parking lot of the destination is registered, if the current position of the mobile object identified to be at a place other than on a road is subsequently identified to be on a road, the position registering apparatus 100 registers a returning point onto the road as an exit point from the parking lot, and when a new returning point is registered as an exit point from the parking lot, if an exit point, from the parking lot, in the vicinity of the new returning point has already been registered, the position registering apparatus 100 determines whether the new returning point is to be newly registered as an exit point from the parking lot based on information about these exit points and executes a process based on the determination result. Therefore, a parking lot exit point not preliminarily set in the map information can be registered, and exit points that are actually the same can be prevented from being registered separately as different exit points from the parking lot.

The position registering apparatus 100 can identify an exiting direction when the mobile object returns onto a road and can use this exiting direction to determine whether the new returning point is to be newly registered as an exit point from the parking lot. Therefore, if parking lots are present on both sides of a road including the returning point, it can be detected whether the exit points are for the same parking lot.

An example according to the embodiment of the present invention is described in detail. The description is made by exemplarily illustrating a case where the position registering apparatus according to the embodiment is applied to a navigation apparatus mounted on a vehicle (including four-wheel vehicles and two-wheel vehicles) to record an entrance/exit of a parking lot.

Example

Hardware Configuration of Navigation Apparatus

Figure 3:
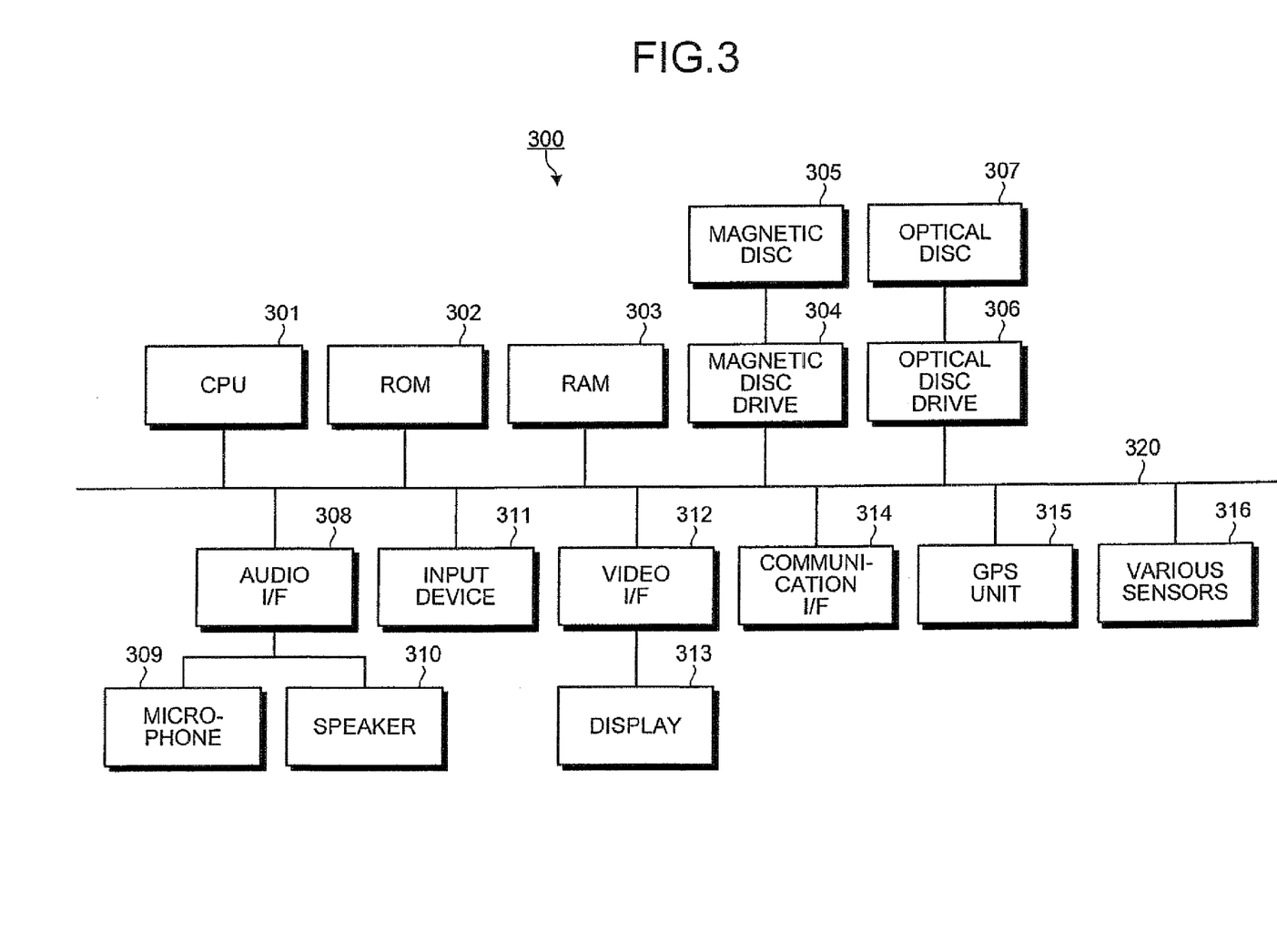
FIG. 3 is a block diagram of a hardware configuration of a navigation apparatus according to an example of the present invention.

A hardware configuration is described for a navigation apparatus 300 according to an example of the present invention. FIG. 3 is a block diagram of a hardware configuration of a navigation apparatus according to the example of the present invention. As shown FIG. 3, the navigation apparatus 300 includes, respectively connected through a bus 420, a CPU 301, a ROM 302, a RAM 303, a magnetic disc drive 304, a magnetic disc 305, an optical disc drive 306, an optical disc 307, an audio I/F (interface) 308, a microphone 309, a speaker 310, an input device 311, a video I/F (interface) 312, a display 313, a communication I/F (interface) 314, a GPS unit 315, and various sensors 316.

The CPU 301 governs overall control of the navigation apparatus 300. The ROM 302 stores therein various programs such as a boot program, a current-position calculating program, a current-position identifying program, a route retrieval program, a route guidance program, a sound generating program, a map-information display program, a communication program, a database generating program, a data analysis program, and a position recording program.

The current-position calculating program causes the current position of the vehicle (the current position of the navigation apparatus 300) to be calculated based on output information concerning the GPS unit and the various sensors 316 described later.

The current-position identifying program causes the current position of the vehicle to be identified on a road or at a place other than a road based on the current position (estimated current position) calculated by executing the current-position calculating program and the road shape data of the map information recorded on the magnetic disc 305 described later.

The route retrieval program causes the optimum route from a start point to a destination to be retrieved with the use of the map information, etc., recorded on the magnetic disc 305 described later. The optimum route is the shortest (or fastest) route to the destination or a route most satisfying a condition specified by a user. A guide route retrieved by executing the route retrieval program is output to the audio I/F 308 or the video I/F 312 though the CPU 301, for example.

The route guidance program causes route guidance information to be generated in real time based on guide route information retrieved by executing the route retrieval program, position information indicating the current position of the vehicle calculated by executing the current-position calculating program, and the map information recorded on the magnetic disc 305 described later. The route guidance information generated by executing the route guidance program is output to the audio I/F 308 or the video I/F 312 though the CPU 301, for example.

The sound generating program causes information to be generated for tones and sounds corresponding to sound patterns. That is, audio guidance information corresponding to guidance points is caused to be generated based on the route guidance information generated by executing the route guidance program. The generated audio guidance information is output to the audio I/F 308 though the CPU 301, for example.

The map-information display program causes a display format of the map information that is displayed on the display 313 by the video I/F 312 to be determined and causes the map information to be displayed on the display 313 in the determined format.

The position recording program causes the entrance point or the exit point from the parking lot to be recognized with the use of the current position calculated by the current-position calculating program and the map information recorded on the magnetic disc 30S described later. The recognized entrance point or exit point from the parking lot is caused to be recorded in a recording medium such as the magnetic disc 305 and the optical disc 307 described later or a memory not shown.

The RAM 303 is used as a work area of the CPU 301, for example.

The magnetic disc drive 304 controls the reading/writing of data from/to the magnetic disc 305 under the control of the CPU 301. The magnetic disc 305 stores thereon the data written under the control of the magnetic disc drive 304. The magnetic disc 305 may be an HD (hard disc) or an FD (flexible disc), for example.

An example of information recorded on the magnetic disc 305 includes map information used for route retrieval/route guidance. The map information includes background data representing features such as buildings, rivers, and ground surfaces, and road shape data representing shapes of roads. The map information is depicted two-dimensionally or three-dimensionally on the display 313. During the route guidance by the navigation apparatus 300, a vehicle mark is superimposed on the map information and displayed to indicate the current position of the vehicle.

The road shape data also includes traffic condition data. The traffic condition data includes, for example, information concerning the presence of a traffic light, a crosswalk, entrances/exits and junctions of expressways for nodes, and lengths (distances) of links, road widths, direction of travel, road types (such as expressway, toll road, general road), etc., for links.

Among the traffic condition data, information concerning past traffic congestion is stored as past traffic congestion information after statistical processing based on season, day of the week, long holiday seasons, the time of day, etc. Although the navigation apparatus 300 acquires, for example, information concerning current traffic congestion from road traffic information received by the communication I/F 314 described later, the past traffic congestion information can be used to forecast congestion at a specified time of day, for example.

Although the map information is recorded on the magnetic disc 305 in this example, the map information may be recorded on the optical disc 307 described later. The map information is not limited to being recorded in the constituent units integrally provided among the hardware of the navigation apparatus 300 and may be provided externally from the navigation apparatus 300. In this case, the navigation apparatus 300 may acquire the map information through the communication I/F 314 via a network. The map information acquired in this way is stored in the RAM 303, for example.

The optical disc drive 306 controls the reading/writing of data from/to the optical disc 307 under the control of the CPU 301. The optical disc 307 is a removable recording medium and data is read from the optical disc 307 under the control of the optical disc drive 306. A writable recording medium can be utilized for the optical disc 307. The removable recording medium can be a medium other than the optical disc 307, such as an MO and a memory card.

The audio I/F 308 is connected to the microphone 309 for audio input and the speaker 310 for audio output. Sound received by the microphone 309 is A/D-converted within the audio I/F 308. The speaker 310 may be disposed on the inside of the vehicle and/or on the outside of the vehicle. The speaker 310 outputs sound based on audio signals from the audio I/F 308. The sound input from the microphone 309 can be recorded as audio data on a recording medium such as the magnetic disc 305, the optical disc 307, or on a memory not shown.

The input device 311 includes a remote controller including keys for entering characters, numeric values, and various instructions, a keyboard, a mouse, a touch panel, etc.

The video I/F 312 is connected to the display 313. Specifically, the video I/F 312 includes, for example, a graphic controller that generally controls the display 313, a buffer memory such as VRAM (Video RAM) that temporarily stores immediately displayable image information, and a control IC that controls the display 313 based on image data output from the graphic controller.

The display 313 displays icons, cursors, menus, windows, or various data such as text and images. For example, a CRT, a TFT liquid crystal display, a plasma display, etc., can be employed as the display 313.

The communication I/F 314 is wirelessly connected to a network and functions as an interface between the navigation apparatus 300 and the CPU 301. Further, the communication I/F 314 is wirelessly connected to a communication network such as the internet and functions as an interface between the CPU 301 and the communication network.

The network includes a LAN, a WAN, a public line network, a portable telephone network, etc. Specifically, the communication I/F 314 includes, for example, an FM tuner, a VICS (Vehicle Information and Communication System: registered trademark)/beacon receiver, a radio navigation apparatus, and other navigation devices, and acquires the road traffic information distributed from VICS centers and concerning for example congestion and traffic regulations.

The GPS unit 315 receives signals from GPS satellites and outputs information indicating the current position of the vehicle. The information output by the GPS unit 315 is used along with values output from the various sensors 316, described later, when the CPU 301 calculates the current position (estimated current position) of the vehicle. The information indicating the current position is information identifying one point on the map information, for example, latitude/longitude and altitude.

The various sensors 316 output information that can be used to determine the position and behavior of the vehicle, including a vehicle speed sensor, an acceleration sensor, and an angular speed sensor. The values output by the various sensors 316 are used by the CPU 301 to calculate the current position (estimated current position) of the vehicle and to measure variations in velocity and direction.

The various sensors 316 include a sensor that detects vehicle operations by a driver. The vehicle operations detected may include steering operations, input for turn signals, the opening/closing of vehicle doors, the turning on/off of the engine (or the on/off of ACC power source), etc.

Specifically, with regard to the functional constituent units of the position registering apparatus 100 according to the embodiment shown in FIG. 1, i.e., the acquiring unit 101, the position identifying unit 102, the registering unit 103, the entering-method determining unit 104, the destination setting unit 105, the parking determining unit 106, and the storage unit 107, the functions thereof are implemented by the CPU 301, the magnetic disc 305, the optical disc 307, the input device 311, the GPS unit 315, and the various sensors 316, for example.

(Position Recording Process Procedure of Navigation Apparatus)

Figure 4:
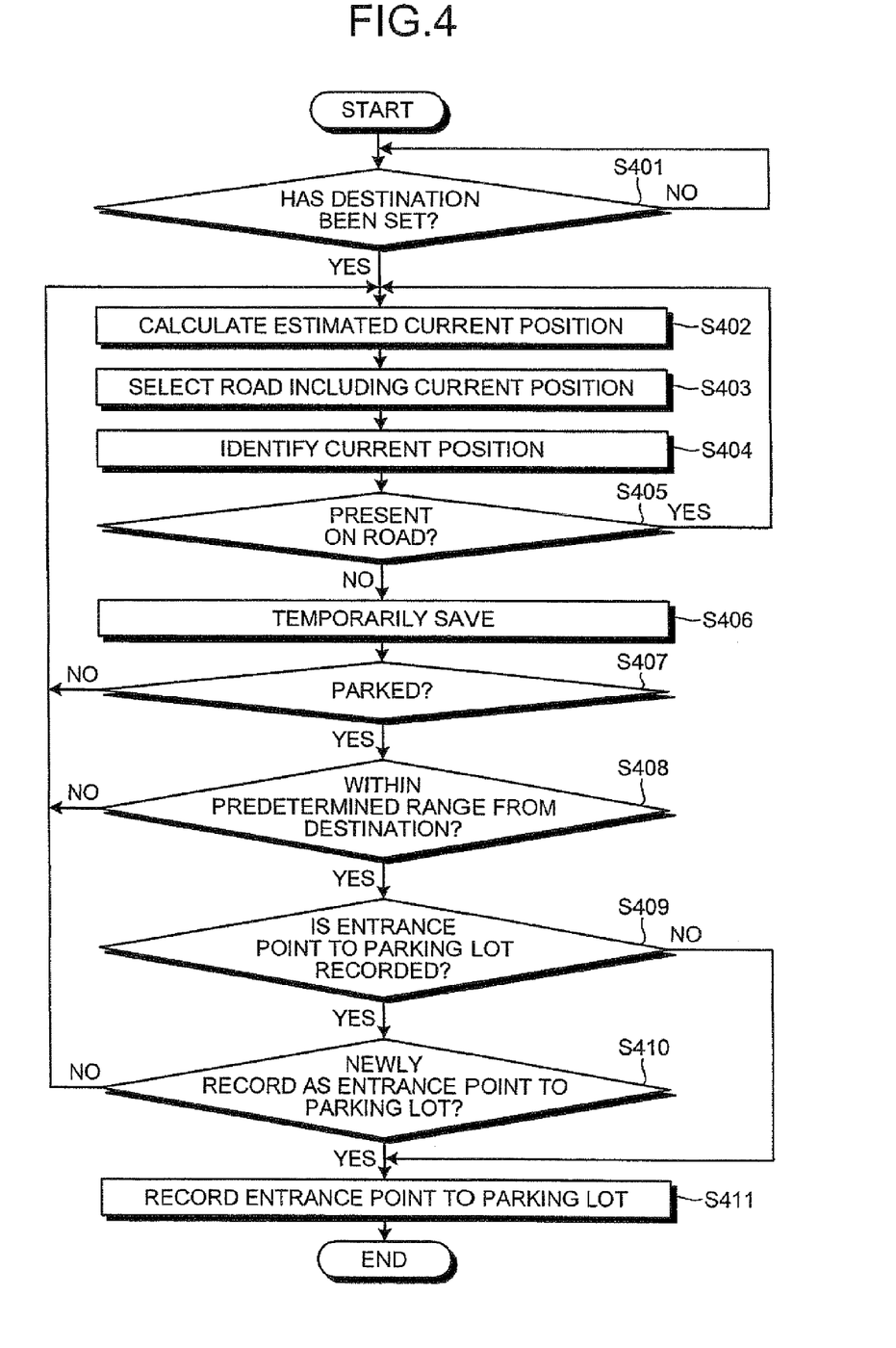
FIG. 4 is a flowchart of an example of a position recording process procedure of the navigation apparatus according to the example of the present invention.

An example of a position recording process procedure of the navigation apparatus 300 according to the example of the present invention is described. FIG. 4 is a flowchart of an example of the position recording process procedure of the navigation apparatus according to the example of the present invention.

As shown in the flowchart of FIG. 4, the navigation apparatus 300 determines whether a destination has been set through the input device 311 (step S401). The destination may be set by a user manipulating the input device 311 such as a remote controller, a keyboard, a mouse, and a touch panel to input the name of a place or the address of the destination.

At step S401, waiting occurs until the destination is set (step S401: NO). When the destination is set (step S401: YES), an estimated current position, i.e., the current position, of the vehicle is calculated based on information output from the GPS unit 315 and the various sensors 316 (step S402). The estimated current position is calculated based on position information indicative of the current position of the vehicle and obtained from the signals received from GPS satellites, vehicle speed information output from the vehicle speed sensor, and vehicle angular speed information (information concerning the amount of change in the direction of the vehicle) output from the angular speed sensor.

Based on the estimated current position calculated at step S402, a road including the current position of the vehicle is selected (step S403). For example, a road closest to the estimated current position is selected as the road including the current position of the vehicle. Alternatively, a direction of a road present within a predetermined range from the estimated current position (road direction) may be compared with the traveling direction of the vehicle to select a road including the current position of the vehicle. If it is determined that the vehicle is not traveling on a road, no selection is made of a road including the current position of the vehicle.

The current position of the vehicle is subsequently identified based on the information concerning the estimated current position calculated at step S402 and the road shape data of the road selected at step S403 (step S404). For example, if a road including the current position of the vehicle is selected at step S403, the map matching process is executed to identify a position corrected by the map matching process as the current position of the vehicle on the road. If a road that includes the current position of the vehicle is not selected at step S403, the estimated current position calculated at step S402 is identified as the current position of the vehicle. The position indicated by the position information calculated by the GPS unit 315 or the position indicated by the position information corrected by the map matching process is identified as the current position of the vehicle.

It is determined whether the current position of the vehicle identified at step S404 is on a road (step S405). Specifically, for example, if the current position of the vehicle identified at step S404 is a position corrected onto a road by the map matching process, it is determined that the current position of the vehicle is on a road. If the current position of the vehicle identified at step S404 is the estimated current position calculated at step S402, it is determined that the current position of the vehicle is not on a road.

At step S405, if it is determined that the current position of the mobile object is on a road (step S405: YES), the process goes to step S402. On the other hand, if it is determined that the current position of the mobile object is not on a road (step S405: NO), a deviation point where the vehicle deviated from a road is temporarily saved in a memory, etc., not shown, (step S406). The deviation point is the last current position of the vehicle identified to be on a road. All the deviation points where the vehicle deviated from the road may temporarily be saved, or only deviation points located within a predetermined range from the destination may temporarily be saved.

It is determined whether the vehicle is parked at a place other than on a road (step S407). With regard to the determination of whether the vehicle is parked, for example, vehicle operations by a driver may be detected by the various sensors 316, etc., to perform the determination based on the detection result. Specifically, for example, if it is determined that the current position of the vehicle is not on a road and the engine of the vehicle is subsequently turned off (or the ACC power source is turned off), it is determined that the vehicle is parked. Alternatively, in a case where the vehicle does not move from the same point for a predetermined period or longer, or a driver applies the parking brake or changes a shift position to the parking position, it is determined that the vehicle is parked.

If it is determined that the vehicle is parked (step S407: YES), it is determined whether the temporarily saved deviation point is within a predetermined range of the destination (step S408). The predetermined range of the destination is set according to the destination and is defined by a circle that encompasses the destination with the destination at a central position, for example. The predetermined range may be set according to the type of the destination. For example, if the destination is a large facility such as an amusement park, a range defined by a circle with a radius of 1 km can be set, and if the destination is a small facility such as a convenience store, a range defined by a circle with a radius of 50 m can be set. On the other hand, if it is determined that the vehicle is not parked (step S407: NO), the process goes to step S402.

If the deviation point is within the predetermined range of the destination at step S408 (step S408: YES), it is determined whether an entrance point to the parking lot of the destination is already recorded (step S409). On the other hand, if the deviation point is not within the predetermined range of the destination (step S408: NO), the process goes to step S402.

If it is determined that an entrance point to the parking lot of the destination is already recorded (step S409: YES), it is determined whether the deviation point is to be newly recorded as an entrance point to the parking lot of the destination set at step S401 (step S410). For example, specifically, if the distance between the deviation point and the previously recorded entrance point to the parking lot of the destination is greater than a predetermined value, the deviation point is newly recorded as an entrance point to the parking lot of the destination. On the other hand, when the distance between the deviation point and the previously recorded entrance point to the parking lot of the destination is not greater than a predetermined value, but the road including the deviation point is different from the road including the previously recorded entrance point to the parking lot of the destination, the deviation point is newly recorded as an entrance point to the parking lot of the destination.

When a distance between the new deviation point and the previously recorded entrance point to the parking lot of the destination is not greater than a predetermined value, if it is determined that the road including the new deviation point is identical to the road including the previously recorded entrance point to the parking lot of the destination and the entering direction corresponding to the new deviation point is different from the entering direction of the entering method correlated and recorded with the previously recorded entrance point, the deviation point is newly recorded as an entrance point to the parking lot.

When the distance between the new deviation point and the previously recorded entrance point to the parking lot of the destination is not greater than a predetermined value, if it is determined that the road including the new deviation point is identical to the road including the previously recorded entrance point to the parking lot of the destination and the entering direction corresponding to the new deviation point is identical to the entering direction of the entering method correlated and recorded with the previously recorded entrance point, the deviation point is not recorded as an entrance point to the parking lot.

Figure 5:
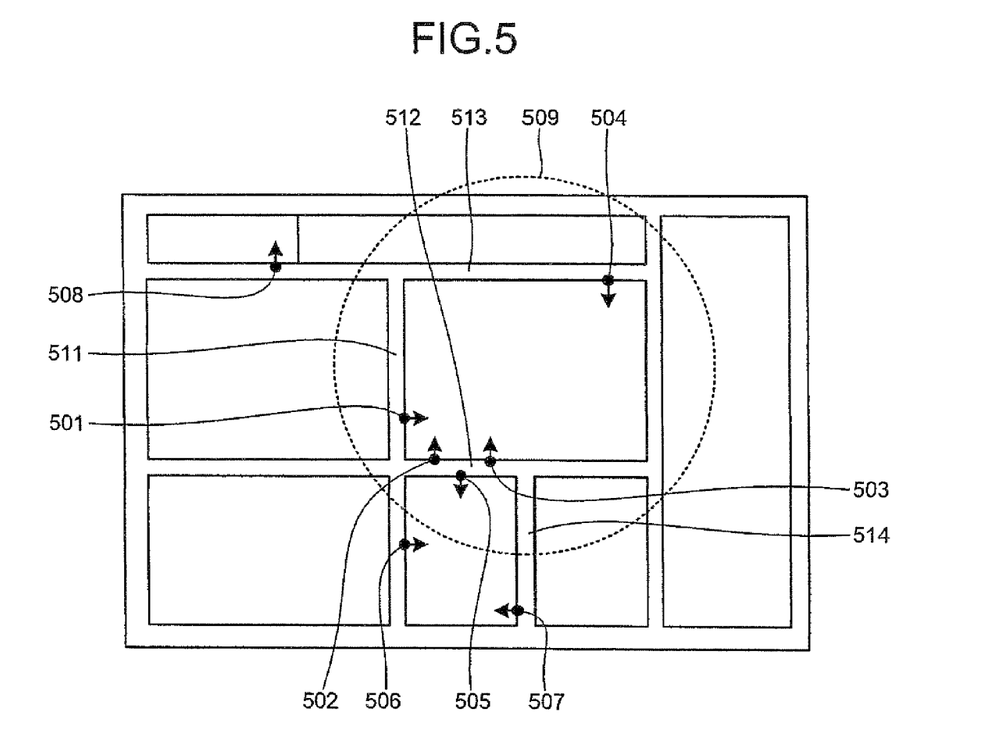
FIG. 5 is a view of an example of a situation when a vehicle enters a parking lot.

A specific example is described for the determination of whether a deviation point is to be newly recorded as an entrance point to the parking lot of the destination set at step S401. FIG. 5 is a view of an example of a situation when a vehicle enters a parking lot. In FIG. 5, positions 501 to 508 are deviation points or recorded entrance points of the parking lot of the destination, and a predetermined range 509 is a range defined by a circle having a predetermined radius and the destination at a central position. Arrows depicted near the positions 501 to 508 indicate entering directions when the vehicle is deviates at the positions 501 to 508.

As shown in FIG. 5, for example, if the position 501 is already recorded as an entrance point to the parking lot of the destination and a new deviation point 502 is detected, since roads leading to the respective points are different although the distance between the position 501 and the new deviation point 502 is short, the positions are considered to be different parking lot entrances, and the new deviation point 502 is newly recorded as an entrance point to the parking lot of the destination.

For example, if the position 502 is already recorded as an entrance point to the parking lot of the destination and a new deviation point 503 is detected, since the distance between the position 502 and the new deviation point 503 is short, the road leading to the respective points is the same, and the entering directions are also the same, the positions are considered to be the same parking lot entrance, and the new deviation point 503 is not recorded as an entrance point to the parking lot of the destination.

For example, if the position 503 is already recorded as an entrance point to the parking lot of the destination and a new deviation point 504 is detected, since the distance between the position 503 and the new deviation point 504 is long and roads leading to the respective points are different, the positions are considered to be different parking lot entrances, and the new deviation point 504 is newly recorded as an entrance point to the parking lot of the destination.

For example, if the position 503 is already recorded as an entrance point to the parking lot of the destination and a new deviation point 505 is detected, since the entering directions are different although the distance between the position 503 and the deviation point 505 is short and road leading to the respective points is the same, the positions are considered to be different parking lot entrances, and the new deviation point 505 is newly recorded as an entrance point to the parking lot of the destination.

When deviation points 506 to 508 are detected, since these deviation points are not within the predetermined range 509, these deviation points are not recorded as entrance points of the parking lot of the destination.

Returning to the description of the flowchart of FIG. 4, if it is determined at step s410 that the deviation point is to be newly recorded as an entrance point to the parking lot of the destination set at step S401 (step S410: YES), the deviation point is recorded, onto the recording medium such as the magnetic disc 305 and the optical disc 307 or a memory not shown, as an entrance point to the parking lot of the destination set at step S401 (step S411) and a sequence of the process of this flowchart ends. On the other hand, if it is determined that the deviation point is not to be recorded as an entrance point to the parking lot of the destination set at step S401 (step S410: NO), the process goes to step S402.

If no entrance point to the parking lot of the destination has been recorded at step S409 (step S409: NO), the deviation point is recorded, onto the recording medium such as the magnetic disc 305 and the optical disc 307 or a memory not shown, as an entrance point to the parking lot of the destination (step S411) and a sequence of the process of this flowchart ends.

An entering method at the time of entry of the vehicle into the parking lot may also be recorded, onto the recording medium such as the magnetic disc 305 and the optical disc 307 or a memory not shown, in correlation with the entrance point to the parking lot of the destination and the position information concerning the recognized entrance point to the parking lot. The entering method into the parking lot entry is information indicating how the vehicle entered into the parking lot entry from a road and may be information indicating that the vehicle can turn right, turn left, or go straight to enter into the parking lot entry from a road, for example.

The entering method may be determined with the use of the position information indicating the current position of the vehicle identified at step S404, the values output from the various sensors 316, the map information, etc. Specifically, position information indicating the current position of the vehicle, the traveling direction of the vehicle, and the road shape data of the road of the traveling vehicle are utilized to determine, for example, that the vehicle turns right to enter the parking lot entrance on the opposite side of the road. Steering operations, etc., performed by a driver may be detected to determine what degree of angle is formed when entering the parking lot entrance.

After the entrance point to the parking lot of the destination is recorded at step S411, if the current position of the vehicle identified to be at a place other than on a road is subsequently identified to be on a road, a returning point onto the road may be recorded as an exit point from the parking lot of the destination. The returning point is the first current position of the vehicle identified to be on a road when the vehicle returns onto a road from a place other than a road. As in the case of the process at step S41, it is determined whether a new returning point is to be registered as an exit point from the parking lot and a process based on the determination result is executed.

If the type of the parking lot is determined with the use of the current position information concerning the vehicle identified at step S404, the values output from the various sensors 316, the map information, etc., the type of the parking lot may be recorded and correlated with the destination.

The type of the parking lot may be information indicating an indoor parking lot, an outdoor parking lot, a multilevel parking lot, and an underground parking lot. When determining the type of the parking lot, for example, if the sensitivity does not change in the signals received from the GPS satellites by the GPS receiver, the parking lot is determined as an outdoor parking lot. For example, if the signals cannot be received from the GPS satellites located in a vertical direction or if it is detected that the mobile object ascends up a slope, the parking lot is determined as a multilevel parking lot. For example, if the reception sensitivity of the signals is less than a threshold value or if it is detected that the mobile object descends down a slope, the parking lot is determined as an underground parking lot. The number of turns made by the vehicle within the parking lot may be measured by the various sensors 316 to determine the number of levels of the parking lot.

As described above, various pieces of information recorded and correlated with the destination may be displayed along with the parking lot information on the display 313 and presented to a driver when the driver searches a parking lot, for example.

When the route retrieval is performed for a destination having a parking lot entrance point recorded, a route to the parking lot entrance point to the destination can be retrieved. If the entering method into the parking lot entry is also recorded, a route taking into account the entering method can be retrieved. For example, if the recorded entering method indicates that the vehicle can turn left to enter into the parking lot entry, a route is retrieved that enables the vehicle to turn left and enter into the parking lot entry.

When a route is searched for from the inside of a parking lot (place other than a road and within a predetermined range from a point) of a location having a parking lot exit point recorded (point previously set as a destination) to an arbitrary destination, a route taking into account the exit point from the parking lot of the located can be searched for. If the exiting method is also recorded, a route taking into account the exiting method can be searched for. For example, if the recorded exiting method indicates that the vehicle can turn left from the parking lot exit to return on the road, a route of turning left to exit the parking lot is searched for.

Although the above example is described based on the premise that a destination is set at step S401, implementation is applicable when a destination is not set. In this case, the processes of step S401, step S408, and step S109 are not executed, and if an entrance point to the parking lot is already recorded within a predetermined range of a temporarily saved new deviation point (e.g., within a range of a circle having a radius of 10 m and centering on the new deviation point), it is determined whether the new deviation point is newly registered as an entrance point to the parking lot based on information about these entrance points. If no entrance point to the parking lot is recorded within a predetermined range of the temporarily saved new deviation point, this new deviation point is recorded as an entrance point to the parking lot.

As described above, according to this example, if the current position of the vehicle identified to be on a road is subsequently identified to be at a place other than on a road within a predetermined range from the set destination and it is determined that the vehicle is parked, the navigation apparatus 300 automatically records the deviation point from the road as an entrance point to a parking lot, and when a new deviation point is recorded as an entrance point to the parking lot, if an entrance point to the parking lot is already recorded for the destination, the navigation apparatus 300 determines whether the new deviation point is newly recorded as an entrance point to the parking lot based on information about these entrance points and executes a recording process based on the determination result. Therefore, a parking lot entrance point not preliminarily set in the map information can be recorded, and actually the same entrance points of the parking lot can be prevented from being separately recorded as different entrance points.

The navigation apparatus 300 can determine an entering direction when the vehicle deviates from a road and can use this entering direction to determine whether the new deviation point is newly recorded as an entrance point to the parking lot. Therefore, if parking lots are present on both sides of a road including the deviation point, it can be detected whether entrance points are of the same parking lot.

If the current position of the vehicle identified within the parking lot of the destination is subsequently identified to be on a road, the navigation apparatus 300 automatically records the returning point of the vehicle returned on the road as an exit point from the parking lot, and when a new returning point is recorded as an exit point of the parking lot of the destination, if an exit point from the parking lot is already recorded for the destination, the navigation apparatus 300 determines whether the new deviation point is newly recorded as an exit point of the parking lot of the destination based on information about these exit points and executes a recording process based on the determination result. Therefore, a parking lot exit point not preliminarily set in the map information can be recorded, and actually the same exit points of the parking lot can be prevented from being separately recorded as different exit points.

The navigation apparatus 300 can determine an exiting direction when the vehicle returns on a road and can use this exiting direction to determine whether the new returning point is newly recorded as an exit point from the parking lot. Therefore, if parking lots are present on both sides of a road including the returning point, it can be detected whether exit points are of the same parking lot.

As described above, the navigation apparatus 300 can automatically record various pieces of information such as parking lot entry and exit points of a predetermined point not preliminarily recorded as map information and can utilize the information when a user conducts route search, etc. Therefore, a user can acquire the optimum route suitable for a use environment, and convenience for the user can be improved.

The position registering method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The invention claimed is:

1. A position registering apparatus comprising:
a computer hardware device having
i) an acquiring unit that acquires traveling state information indicating a traveling state of a mobile object;
ii) a position identifying unit that identifies a first current position of the mobile object as being on a road, at a first point in time, based on the traveling state information and map information, the position identifying unit connected to receive an output of the acquiring unit;
iii) a parking determining unit that determines whether the mobile object is parked, the parking determining unit connected to receive an output of the position identifying unit;
iv) a storage unit; and
v) a registering unit that registers, into the storage unit, deviation points representing entrance points to a parking lot,
wherein the registering unit registers, into the storage unit, the first current position as a first deviation point representing a first entrance point for the mobile object to move from the road to the parking lot, when i) the parking determining unit determines, at a second current position at a second point in time subsequent to the first point in time, that the mobile object is parked, together with ii) the second current position being identified as not to be on any road, wherein the first current position is a last current position identified to be on the road prior to the second current position being identified as not to be on any road,
wherein, at a third point in time subsequent to the second point in time, i) in a first situation when the parking determining unit determines that the mobile object is parked, together with a second deviation point representing a potential second entrance point to the parking lot being determined to be in a vicinity of the first deviation point representing the first entrance point to the parking lot, the registering unit determines whether the second deviation point is to be registered as a second entrance point to the parking lot based on information concerning the first entrance point and executes a process based on a determination result, and ii) in a second situation when the parking determining unit determines that the mobile object is not parked, the second deviation point is not registered into the registering unit as the second entrance point to the parking lot.

2. The position registering apparatus according to claim 1, wherein
in the first situation, the registering unit registers the second deviation point, when the second deviation point is on a road different from the road including the first entrance point.

3. The position registering apparatus according to claim 1, further comprising an entering-method determining unit that determines an entering method based on the traveling state information when the second current position of the mobile object is identified not to be on any road, wherein
the registering unit correlates and registers the entering method with the first entrance point, into the storage unit, and
the registering unit registers the second deviation point when the second deviation point is on the road including the first entrance point and an entering direction corresponding to the second deviation point is different from an entering direction of the entering method correlated and registered with the first entrance point.

4. The position registering apparatus according to claim 3, wherein the registering unit does not register the second deviation point when the second deviation point is on the road including the first entrance point and the entering direction corresponding to the second deviation point is identical to the entering direction of the entering method correlated and registered with the first entrance point.

5. The position registering apparatus according to claim 1, wherein,
the registering unit registers into the storage unit, a first returning point onto a road as a first exit point from the parking lot, when another current position, subsequent to the second current position identified not to be on any road and after the first entrance point is registered, is identified to be on a road, and
the registering unit, when a second returning point is in a vicinity of the first exit point, determines whether the second returning point is to be registered as a second exit point from the parking lot based on information about the first exit point and executes a process based on a determination result.

6. A position registering apparatus comprising:
a computer hardware device having
i) an acquiring unit that acquires traveling state information indicating a traveling state of a mobile object;
ii) a position identifying unit that identifies a first current position of the mobile object as being on a road, at a first point in time, based on the traveling state information and map information, the position identifying unit connected to receive an output of the acquiring unit;
iii) a destination setting unit that sets a destination;
iv) a parking determining unit that determines whether the mobile object is parked;
v) a storage unit; and
vi) a registering unit that registers, into the storage unit, deviation points representing entrance points to a parking lot of the destination,
wherein the registering unit registers, into the storage unit, the first current position as a first deviation point representing a first entrance point for the mobile object to move from the road to the parking lot of the destination when the mobile object is determined, at a second current position at a second point in time subsequent to the first point in time, to be parked within a predetermined range from the destination together with the second current position being identified as not to be on any road, wherein the first current position is a last current position identified to be on the road prior to the second current position being identified as not to be on any road,
wherein, at a third point in time subsequent to the second point in time, i) in a first situation when the parking determining unit determines that the mobile object is parked, together with when the first entrance point has been registered, the registering unit determines whether a second deviation point representing a potential second entrance point to the parking lot is to be registered as a second entrance point to the parking lot of the destination based on information about the first entrance point and executes a process based on a determination result, and, ii) in a second situation, when the parking determining unit determines that the mobile object is not parked, the second deviation point is not registered into the registering unit as the second entrance point to the parking lot.

7. The position registering apparatus according to claim 6, wherein, in the first situation, the registering unit registers the second deviation point when a distance between the second deviation point and the first entrance point exceeds a predetermined value.

8. The position registering apparatus according to claim 6, wherein, in the first situation, the registering unit registers the second deviation point when a distance between the second deviation point and the first entrance point does not exceed a predetermined value and the second deviation point is from a road different from the road including the first entrance point.

9. The position registering apparatus according to claim 6, further comprising an entering-method determining unit that determines an entering method based on the traveling state information when the second current position of the mobile object is identified not to be on any road, wherein
the registering unit correlates and registers the entering method with the first entrance point into the storage unit, and
the registering unit registers the second deviation point as the second entrance point to the parking lot of the destination when a distance between the second deviation point and the first entrance point does not exceed a predetermined value, the second deviation point is on the road including the first entrance point, and an entering direction corresponding to the second deviation point is different from an entering direction of the entering method correlated and registered with the first entrance point.

10. The position registering apparatus according to claim 9, wherein the registering unit does not register the second deviation point, when a distance between the second deviation point and the first entrance point does not exceed a predetermined value, the second deviation point is from the road including the first entrance point, and the entering direction corresponding to the second deviation point is identical to the entering direction of the entering method correlated and registered with the first entrance point.

11. The position registering apparatus according to claim 6, wherein the registering unit registers into the storage unit, a first returning point onto a road as a first exit point of the parking lot of the destination, when another current position, subsequent to the second current position identified not to be on any road and after the first entrance point is registered, is subsequently identified to be on a road, and
the registering unit, if the first exit point of the parking lot of the destination has been registered, determines whether a second returning point is to be registered as a second exit point from the parking lot of the destination based on information about the first exit point and executes a process based on a determination result.

12. A position registering method comprising:
with a computer hardware device having an acquiring unit operatively connected to a position identifying unit, a parking determining unit, and a registering unit, executing i) an acquiring step of acquiring traveling state information, from the acquiring unit, indicating a traveling state of a mobile object;
ii) a position identifying step of identifying a first current position of the mobile object as being on a road, at a first point in time, based on the traveling state information, from the position identifying unit, and map information;
iii) a parking determining step of determining whether the mobile object is parked, the parking determining unit connected to receive an output of the position identifying unit; and
iv) a registering step of registering, using the registering unit, into a storage unit, deviation points representing entrance points to a parking lot,
wherein the registering unit registers, into the storage unit, the first current position as a first deviation point representing a first entrance point for the mobile object to move from the road to the parking lot, when the parking determining step determines, at a second current position at a second point in time subsequent to the first point in time, that the mobile object is parked together with the second current position being identified not to be on any road, wherein the first current position is a last current position identified to be on the road prior to the second current position being identified as not to be on any road,
wherein, at a third point in time subsequent to the second point in time, i) in a first situation when having determined that the mobile object is parked, together with when a second deviation point representing a potential second entrance point to the parking lot is in a vicinity of the first deviation point representing the first entrance point to the parking lot, the registering step includes determining whether the second deviation point is to be registered as a second entrance point to the parking lot based on information concerning the first entrance point and executing a process based on a determination result, and ii) in a second situation when the parking determining step determines that the mobile object is not parked, the second deviation point is not registered into the registering unit as the second entrance point to the parking lot.

13. A position registering method comprising:
with a position registering apparatus that includes an acquiring unit operatively connected to a position identifying unit, a parking determining unit, a destination-setting unit, and a registering unit,
using the acquiring unit of the position registering apparatus, acquiring traveling state information indicating a traveling state of a mobile object;
using the position-identifying unit of the position registering apparatus, a position identifying step of identifying a first current position of the mobile object as being on a road, at a first point in time, based on the traveling state information and map information;
using the destination-setting unit of the position registering apparatus, a destination setting step of setting a destination;
a saving step of temporarily saving the first current position as a first deviation point representing a first entrance point for the mobile object to move from a road to a parking lot of the destination when, at a second current position at a second point in time subsequent to the first point in time, the mobile object is identified not to be on any road;
using the parking-determining unit of the position registering apparatus, a parking determining step of determining whether the mobile object is parked when the second current position is identified not to be on any road; and using the registering unit of the position registering apparatus, a registering step registering the first deviation point as the first entrance point from the road to the parking lot of the destination when the first deviation point is within a predetermined range from the destination and the mobile object is determined to be parked, wherein, at a third point in time subsequent to the second point in time, i) in a first situation when having determined that the mobile object is parked, then the registering step, when the first entrance point to the parking lot of the destination has been registered, further includes determining whether a second deviation point representing a potential second entrance point to the parking lot is to be registered as a second entrance point to the parking lot of the destination based on information about the first entrance point and executing a process based on a determination result, and ii) in a second situation when the parking determining step determines that the mobile object is not parked, the second deviation point is not registered into the registering unit as the second entrance point to the parking lot.

14. A computer-readable recording non-transitory medium storing therein a position-registering computer program causing a computer to execute:

an acquiring step of acquiring traveling state information indicating a traveling state of a mobile object;

a position identifying step of identifying a first current position of the mobile object as being on a road, at a first point in time, based on the traveling state information, from a position identifying unit, and map information;

a parking determining step of determining whether the mobile object is parked, wherein a parking determining unit is connected to receive an output of the position identifying unit; and a registering step of registering, into a storage unit, a first deviation point representing a first entrance point for the mobile object to move from the road to a parking lot when the parking determining step determines, at a second current position at a second point in time subsequent to the first point in time, that the mobile object is parked together with when the second current position being identified not to be on any road, wherein the first current position is a last current position identified to be on the road prior to the second current position being identified as not to be on any road, wherein, at a third point in time subsequent to the second point in time, i) in a first situation the registering step, when the parking determining step determines that the mobile object is parked, together with when a second deviation point representing a potential second entrance point to the parking lot is in a vicinity of the first deviation point representing the first entrance point to the parking lot, further includes determining whether the second deviation point is to be registered as a second entrance point to the parking lot based on information concerning the first entrance point and executing a process based on a determination result, and ii) in a second situation when the parking determining step determines that the mobile object is not parked, the second deviation point is not registered into the registering unit as the second entrance point to the parking lot.

15. A computer-readable recording non-transitory medium storing therein a position-registering computer program causing a computer to execute:

an acquiring step of acquiring traveling state information indicating a traveling state of a mobile object;

a position identifying step of identifying a first current position of the mobile object as being on a road, at a first point in time, based on the traveling state information and map information;

a destination setting step of setting a destination;

a saving step of temporarily saving the first current position as a first deviation point representing a first entrance point for the mobile object to move from a road to a parking lot of the destination when, at a second current position at a second point in time subsequent to the first point in time, the mobile object is identified not to be on any road;

a parking determining step of determining whether the mobile object is parked when the second current position is identified not to be on any road; and a registering step of registering the first deviation point as the first entrance point from the road to the parking lot of the destination when the first deviation point is within a predetermined range from the destination and the mobile object is determined to be parked, wherein, at a third point in time subsequent to the second point in time, i) in a first situation the registering step, when the parking determining step determines that the mobile object is parked, together with when the first entrance point to the parking lot of the destination has been registered, further includes determining whether a second deviation point representing a potential second entrance point to the parking lot is to be registered as a second entrance point to the parking lot of the destination based on information about the first entrance point and executing a process based on a determination result, and ii) in a second situation when the parking determining step determines that the mobile object is not parked, the second deviation point is not registered into the registering unit as the second entrance point to the parking lot.

* * * * *

UNITED STATES PATENT AND TRADEMARK OFFICE
CERTIFICATE OF CORRECTION

PATENT NO. : 8,456,326 B2  Page 1 of 1
APPLICATION NO. : 12/294407
DATED : June 4, 2013
INVENTOR(S) : Daisuke Sakata It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1189 days.

Signed and Sealed this
Eighth Day of September, 2015

Michelle K. Lee
*Director of the United States Patent and Trademark Office*